United States Patent
Sherlekar et al.

(10) Patent No.: US 11,328,109 B2
(45) Date of Patent: May 10, 2022

(54) REFINING MULTI-BIT FLIP FLOPS MAPPING WITHOUT EXPLICIT DE-BANKING AND RE-BANKING

(71) Applicant: Synopsys, Inc., Mountain View, CA (US)

(72) Inventors: Deepak Dattatraya Sherlekar, Mountain View, CA (US); Mohammad Ziaullah Khan, Mountain View, CA (US); Channakeshav Ananth, Bangalore (IN); Muniraj Ramamurthy, Mountain View, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 16/942,861

(22) Filed: Jul. 30, 2020

(65) Prior Publication Data
US 2021/0034804 A1 Feb. 4, 2021

(30) Foreign Application Priority Data
Jul. 31, 2019 (IN) .............................. 201911030998

(51) Int. Cl.
| | | |
|---|---|---|
| G06F 30/327 | (2020.01) | |
| G06F 30/392 | (2020.01) | |
| G06F 30/398 | (2020.01) | |
| G06F 119/06 | (2020.01) | |
| G06F 119/12 | (2020.01) | |

(52) U.S. Cl.
CPC .......... *G06F 30/327* (2020.01); *G06F 30/392* (2020.01); *G06F 30/398* (2020.01); *G06F 2119/06* (2020.01); *G06F 2119/12* (2020.01)

(58) Field of Classification Search
CPC .... G06F 30/327; G06F 30/392; G06F 30/398; G06F 2119/06; G06F 2119/12
See application file for complete search history.

(56) References Cited

U.S. PATENT DOCUMENTS

| | | | | |
|---|---|---|---|---|
| 7,774,735 | B1* | 8/2010 | Sood ....................... | G06F 30/30 716/103 |
| 2013/0305199 | A1* | 11/2013 | He .......................... | G06F 30/34 716/104 |
| 2016/0266604 | A1* | 9/2016 | Krishnamurthy .. | H03K 19/0016 |

(Continued)

OTHER PUBLICATIONS

C. Santos, R. Reis, G. Godoi, M. Barros and F. Duarte, "Multi-bit flip-flop usage impact on physical synthesis," 2012 25th Symposium on Integrated Circuits and Systems Design (SBCCI), 2012, pp. 1-6, doi: 10.1109/SBCCI.2012.6344435. (Year: 2012).*

(Continued)

*Primary Examiner* — Stacy Whitmore
(74) *Attorney, Agent, or Firm* — Patterson + Sheridan, LLP

(57) ABSTRACT

Refining multi-bit flip flops mapping without explicit de-banking and re-banking is provided by identifying a set of equivalent flops in a layout, that include a first flop having a first logic routing and a first location in the layout and a second flop having a second logic routing and a second location in the layout; and remapping the first logic of the first flop from the first location to the second location and the second logic of the second flop from the second location to the first location.

18 Claims, 8 Drawing Sheets

(56) References Cited

U.S. PATENT DOCUMENTS

2020/0097634 A1* 3/2020 Chen ............... G06F 30/398
2020/0300914 A1* 9/2020 Watanabe .......... G06F 30/327
2021/0034804 A1* 2/2021 Sherlekar .......... G06F 30/398

OTHER PUBLICATIONS

Y. Chang, C. Hsu, M. P. Lin, Y. Tsai and S. Chen, "Post-placement power optimization with multi-bit flip-flops," 2010 IEEE/ACM International Conference on Computer-Aided Design (ICCAD), 2010, pp. 218-223, doi: 10.1109/ICCAD.2010.5654155. (Year: 2010).*

* cited by examiner

REFINING MULTI-BIT FLIP FLOPS MAPPING WITHOUT EXPLICIT DE-BANKING AND RE-BANKING

CROSS-REFERENCE TO RELATED APPLICATIONS

This application claims priority to and the benefit of Indian Provisional Patent Application No. IN201911030998, filed Jul. 31, 2019, which is incorporated by reference in its entirety.

TECHNICAL FIELD

The present disclosure relates to the field of electronics in general, including cell-based design, multi-bit flip-flops, multi-bit banking, multi-bit de-banking, logic synthesis, placement, sequential mapping, etc.

BACKGROUND

A multi-bit flip-flop (MBFF) contains several flip-flops (also referred to as 'flops' or FFs) that are controlled by a shared set of timing control components. When target performance during chip layout cannot be met, optimization tools often "explode" (or separate) individual FFs from MBFFs that contain a timing critical bit. This process is called de-banking, and results in the mapping of the critical bit reverting to a single bit FF, with the remaining bits mapped to single bit FFs or to smaller MBFFs (i.e., MBFFs with fewer bits contained therein). The tool may subsequently re-cluster exploded fragments of one or more MBFFs into a new set of MBFFs, a process called re-banking.

The process of banking, de-banking, and re-banking is computationally expensive and causes significant and unpredictable perturbation of the design. Incremental placement of new single and multi-bit flip-flops resulting from such transformations may displace the components far from their current locations, and/or cause displacement of many other cells to make room for the new layout. The displacement increases wire delay and degrades performance, and may also disturb the clock distribution to the affected (single and multi-bit) flip-flops, degrading performance due to adverse clock skew. A typical banking, de-banking, or re-banking operation on a 4-bit MBFF results in rewiring many nets connected to the affected flip-flops, with the impact of placement perturbation affecting scores of cells and hundreds or even thousands of timing arcs.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1A:
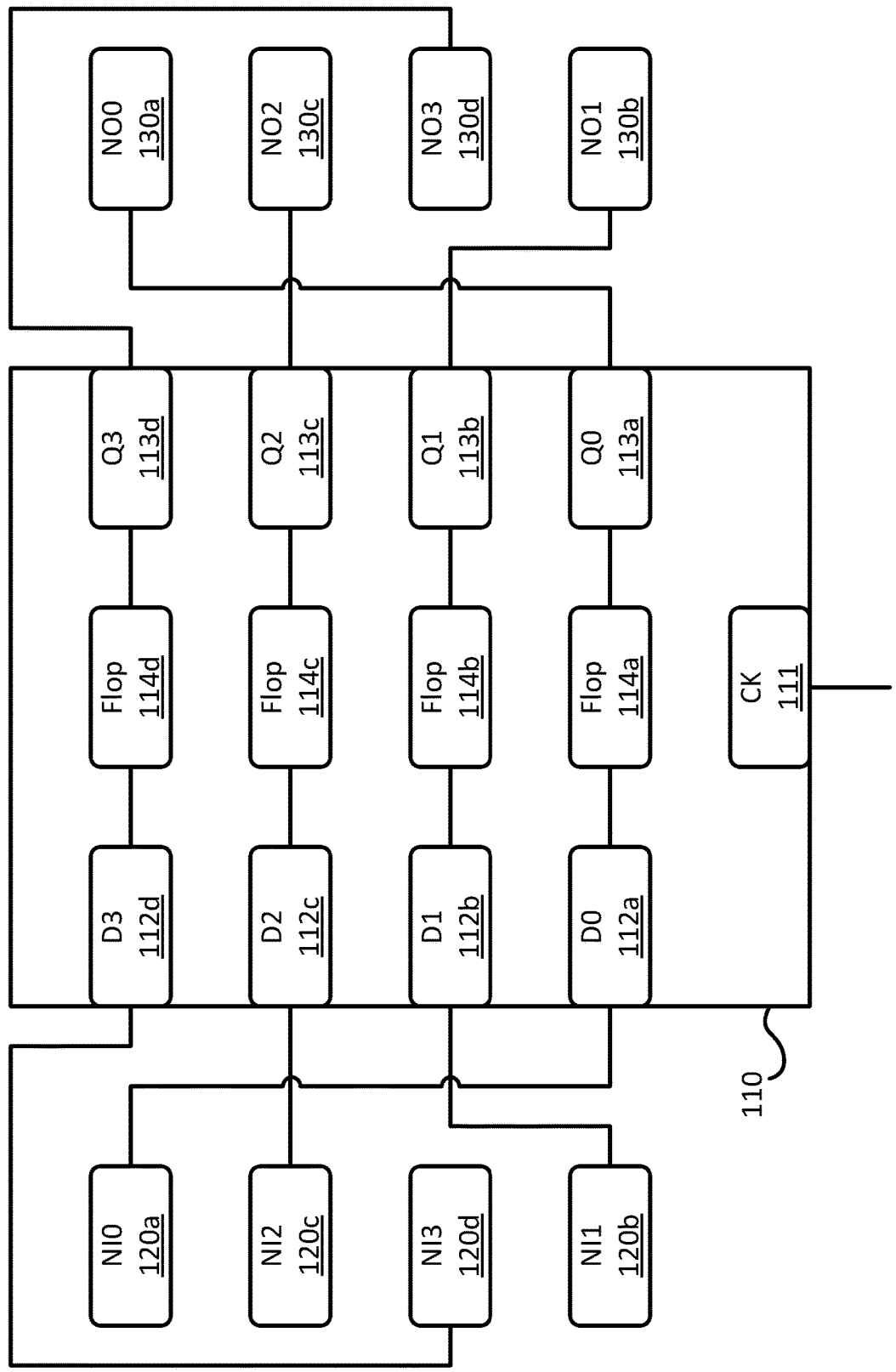
FIGS. 1A and 1B illustrate a remapping where the flops within one 4-bit MBFF are swapped, according to embodiments of the present disclosure.

Aspects of the present disclosure relate to a remapping operation for mapping multi-bit logic elements and/or multi-bit flip flops (MBFF) without explicit de-banking and re-banking. Although the examples are primarily given herein with reference to MBFFs, one of skill in the art will recognize that the teachings are equally applicable to various multi-bit logic elements, where a logic gate is substituted for a flop, and one or more inputs are received by each logic gate.

The remapping operations described in the present disclosure identify a set of equivalent flops in an equivalence class, whether part of MBFFs or conventional single bit Flip Flops (FF). The logical FFs within an equivalence class can be remapped to any of the physical FFs that the logical FFs are currently mapped to. The remapping operation can reconfigure the input parameters affecting the signaling and/or timing of an individual flop, so that a FF that is more sensitive to differences in wire length, timing delays, etc., is repositioned relative to a FF that is less sensitive to those differences.

The problem of remapping individual bits/flops while preserving the underlying physical cells can be reduced to an optimization problem or implemented with a custom optimization algorithm. For example, one may model the problem as a bipartite graph in which a first set of nodes are the logical flops, and a second set of nodes are the current locations of the physical flop to which the logical flops are mapped. In this graph, an edge between a logical flop node and the target physical flop may be assigned a weight, which is a measure of the cost of mapping the logical flop to that physical flop. In such a formulation, the minimum weight matching of the bipartite graph provides a mapping which optimizes the overall cost function In various embodiments, logical equivalence between flops is defined based on the requirements of the design in question. For example, two flops may be considered logically equivalent if those two flops belong to the same clock domain and to the same scan chain. Which flops are considered to be logically equivalent may be further restricted to having the same performance (e.g., same voltage thresholds, same timing characteristics, etc.), but that would normally happen automatically in a timing-driven flow when a lower performance of the flop degrades design performance. Additionally, logically equivalent flops have the same functionality so that, for example, two flops cannot be considered logically equivalent if one has an has an asynchronous reset while other does not have a reset. The mapping may also be further relaxed to permit migration to different but equivalent scan chains when a large scan chain is broken up into smaller equivalent scan chains. Accordingly, a layout can include several flops that are logically equivalent to one another, but are located in the layout at different physical locations, which can affect the operation of those flops.

One possible way to implement a remapping is through rewiring the inputs and outputs so that the logic of a given flop is routed through a different physical location to take advantage of the differences in wire length, timing delays, etc. When a logical flop is remapped from one physical flop to another physical flop, the nets connected to the flop can be rewired to reflect the change in mapping. The current physical flop as well as the new physical flop may be a single bit FF, or a bit in an MBFF (which may be the same or a different MBFF as one another). The present disclosure is generally described in the context of single-bit FFs and MBFFs. However, additional embodiments can be readily applied to combinational logic cells as well. The presently described remapping formulation is that some or all bits in the design are remapped to existing bits. However, the remapping approach described herein can be applied to other routing and placement problems to improve the computational efficiency of remapping those elements.

The main nets in the design netlist which are affected by the rewiring/remapping operation are those nets connected to the D input and the Q output pins of the respective FFs. For example, consider a case where the flops have scan, set, and reset. Then the common signals of scan enable, set, reset, and clock do not need to be reconnected, as those signals are already part of the same net. Changes to scan-in and scan-out connections, implicit within bits of an MBFF or explicitly routed between a flop/MBFF and another flop/MBFF, are recorded on the flops whose mapping changes. The reordering of the scan chain due to the rewiring is also fed back to DFT tools. Likewise, if a FF is migrated from one scan chain to another, that information is also fed back to DFT. If the clock, scan enable, set, reset, scan-in and scan-out connections are already routed, those connections need not be rerouted. Relative to de-banking and re-banking, the presently described remapping operation is computationally inexpensive and reduces physical perturbations in the layout, which degrade wire length and timing. There is no need for incremental placement of the flops, because the physical flops and MBFFs in the design remain in the same locations before and after the remapping. As a result, the only nets to be routed incrementally are those connected to the D and Q pins of flops which are remapped, in contrast to conventional de-banking and re-banking where all nets connected to remapped (affected) flops are rerouted. In some embodiments, however, the combinational logic driven to the D pins of the flops can be moved and sized via incremental placement to improve performance of the flops.

Further, any nets connected to cells which are moved during incremental placement to resolve overlaps are rerouted. When the MBFF remapping described herein is performed after routing, there is no need to discard or reroute traces for common signals such as clock, scan enable, scan-in, scan-out, and reset. In one embodiment, the only signals which may need to be rerouted are D input and Q output. Thus, the number of nets to be rerouted drops from six (for scan flops), seven (for scan flops with reset), or eight (for scan flops with set and reset), to just two nets (i.e., for D input and Q output).

Additionally, the present disclosure improves the multi-bit banking ratio. With conventional methods, only a small fraction of the bits in de-banked multi-bit FFs are re-banked. The improved remapping described herein improves flop area and power by incorporating and maintaining a greater number of flops within MBFFs. Accordingly, routing congestion is decreased and the Quality of Routing (QoR) is improved, which reduces performance degradation and also reduces the combinational logic area in the layout.

FIGS. 1A-1B and 2A-2C illustrate proposed remapping operations through rewiring. For simplicity, many shared connections and the pins for those connection are not illustrated. For example, scan enable, scan in, scan out, set, and reset pins are not shown, but one of skill in the art will recognize that these pins are included in the single-bit FFs and MBFFs described herein. However, a shared clock input 111 is illustrated for purposes of identifying equivalent flops. In some embodiments, any flop with a shared designed (e.g., scan vs. scan with reset vs. scan with set and reset, etc.) receiving a clock signal from a shared source with another flop can be considered logically equivalent to the other flop.

Figure 1B:
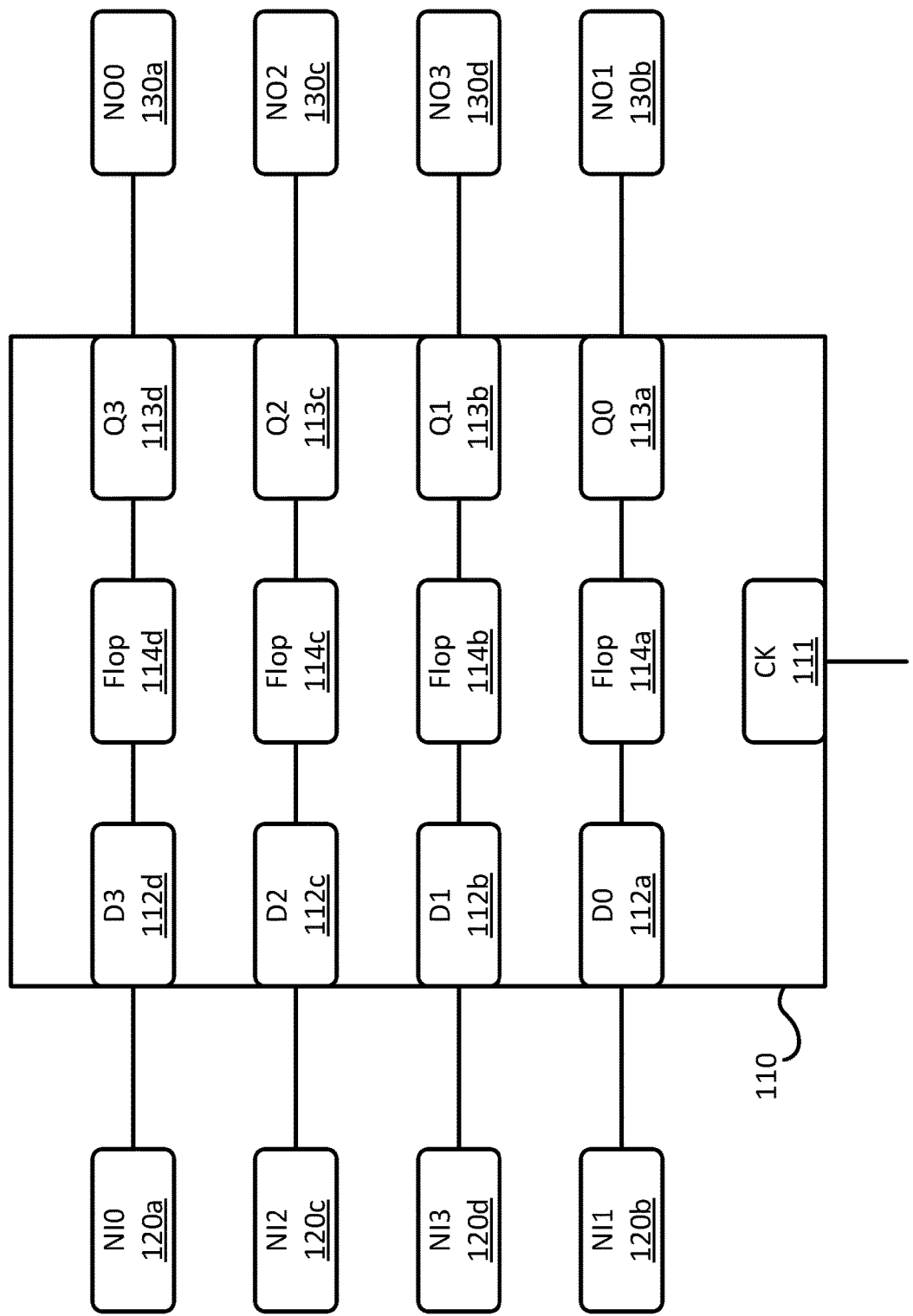

FIGS. 1A and 1B illustrate a remapping where the flops 114a-d (generally, flop 114) within one 4-bit MBFF 110 are swapped, according to embodiments of the present disclosure. In FIGS. 1A and 1B, the MBFF 110 includes a first flop 114a with a first physical input 112a and a first physical output 113a ($D_0$ and $Q_0$, respectively), a second flop 114b with a second physical input 112b and a second physical output 113b ($D_1$ and $Q_1$, respectively), a third flop 114c with a third physical input 112c and a third physical output 113c ($D_2$ and $Q_2$, respectively), and a fourth flop 114d with a fourth physical input 112d and a fourth physical output 113d ($D_3$ and $Q_3$, respectively). Each of the flops 114 is represented in a layout (e.g., a design of an integrated circuit) at a corresponding physical location within a cell and represents a logical node based on the paired inputs/outputs 112/113.

In FIG. 1A, the first flop 114a receives a first logical input 120a and outputs a first logical output 130a ($NI_0$ and $NO_0$, respectively), the second flop 114b receives a second logical input 120b and outputs a second logical output 130b ($NI_1$ and $NO_1$, respectively), the third flop 114c receives a third logical input 120c and outputs a third logical output 130c ($NI_2$ and $NO_2$, respectively), and the fourth flop 114d receives a fourth logical input 120d and outputs a fourth logical output 130d ($NI_3$ and $NO_3$, respectively).

The logical inputs 120a-d (generally, logical input 120) and the logical outputs 130a-d (generally, logical output 130) are cells in the layout that represent various circuit elements which can include combinational logical elements and/or the outputs/inputs from a FF. When a FF is arranged in a scan chain, the FF uses the logical output 130 from one flop 114 for the logical input 120 to a different flop. For example, with reference to FIG. 1A, when the first flop 114a and the second flop 114b are arranged in a scan chain, the first physical output 113a is connected to the second physical input 112b ($Q_0$ to $D_1$) and the first logical output 130a and the second logical input 120b describe the same logical element (i.e., the output from the first flop 114a, where $NO_0=NI_1$).

As will be appreciated, the logical inputs 120 and logical outputs 130 are not always directly routed to the corresponding physical inputs 112 and physical outputs 113, but may be routed with a more indirect path around various circuit elements (not illustrated) that are also included in the layout. The indirect paths increase wire load and impose various delays in timing due to the longer route that the signals travel, parasitic losses, and/or interference imposed by other components in the layout along the route.

FIG. 1B illustrates a remapped version of the MBFF 110 shown in FIG. 1A, in which the logical inputs 120 and logical outputs 130 are rewired so as to be remapped to different, but logically equivalent, flops 114 to avoid or mitigate the effects of the indirect paths to from the corresponding physical inputs 112 and physical outputs 113. In FIG. 1B, the first flop 114a receives a second logical input 120b at the first physical input 112a and outputs from the first physical output 113a to the second logical output 130b ($NI_1$ to $D_0$ and $Q_0$ to $NO_1$, respectively), the second flop 114b receives a fourth logical input 120d at the second physical input 112b and outputs from the second physical output 113b to the fourth logical output 130d (NI$_3$ to D$_1$ and Q$_1$ to NO$_3$, respectively), the third flop 114c receives a third logical input 120c at the third physical input 112c and outputs from the third physical output 113c to the third logical output 130c (NI$_2$ to D$_2$ and Q$_2$ to NO$_2$, respectively), and the fourth flop 114d receives a first logical input 120a at the fourth physical input 112d and outputs from the fourth physical output 113d to the first logical output 130a (NI$_0$ to D$_3$ and Q$_3$ to NO$_0$, respectively).

By remapping which physical locations (and underlying hardware) the logical signals are routed to, the logical signals can experience different delays, path loss (e.g., resistive and inductive losses on the path), and interference, associated with each physical location. Accordingly, by remapping the logical inputs and outputs 120/130 to different physical inputs and outputs 112/113, the layout can improve the operational characteristics of the individual flops 114 within an MBFF without having to de-bank or re-bank the flops 114. Instead, the flops 114 are rewired to correspond to different portions of the logic so that the signal timing an activation voltages (among other properties) required by the logic and hardware are matched to the appropriate nets in the layout.

Figure 2A:
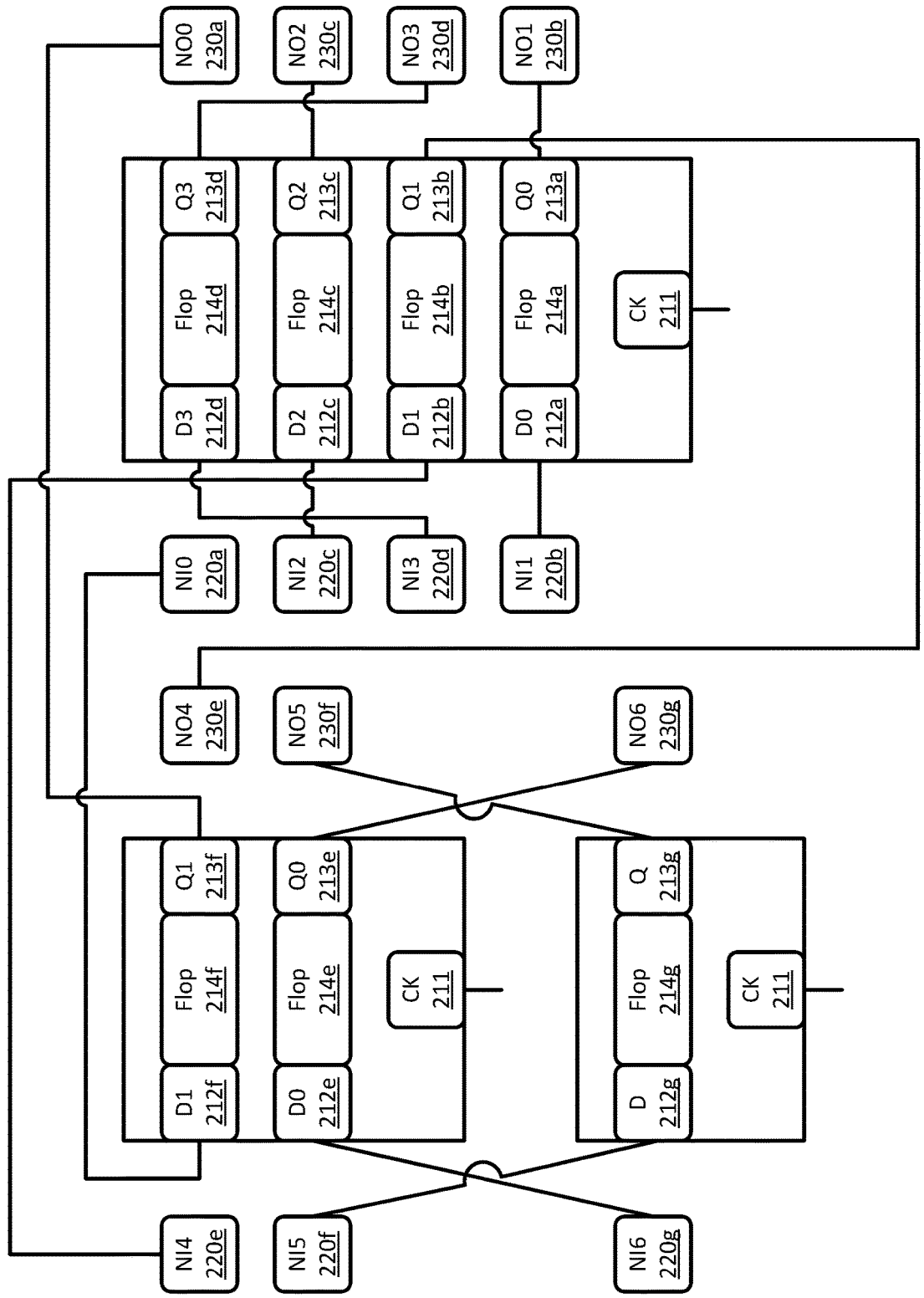
FIGS. 2A-2C illustrate a remapping involving a 4-bit MBFF, a 2-bit MBFF, and a single-bit FF, according to embodiments of the present disclosure.
Figure 2B:
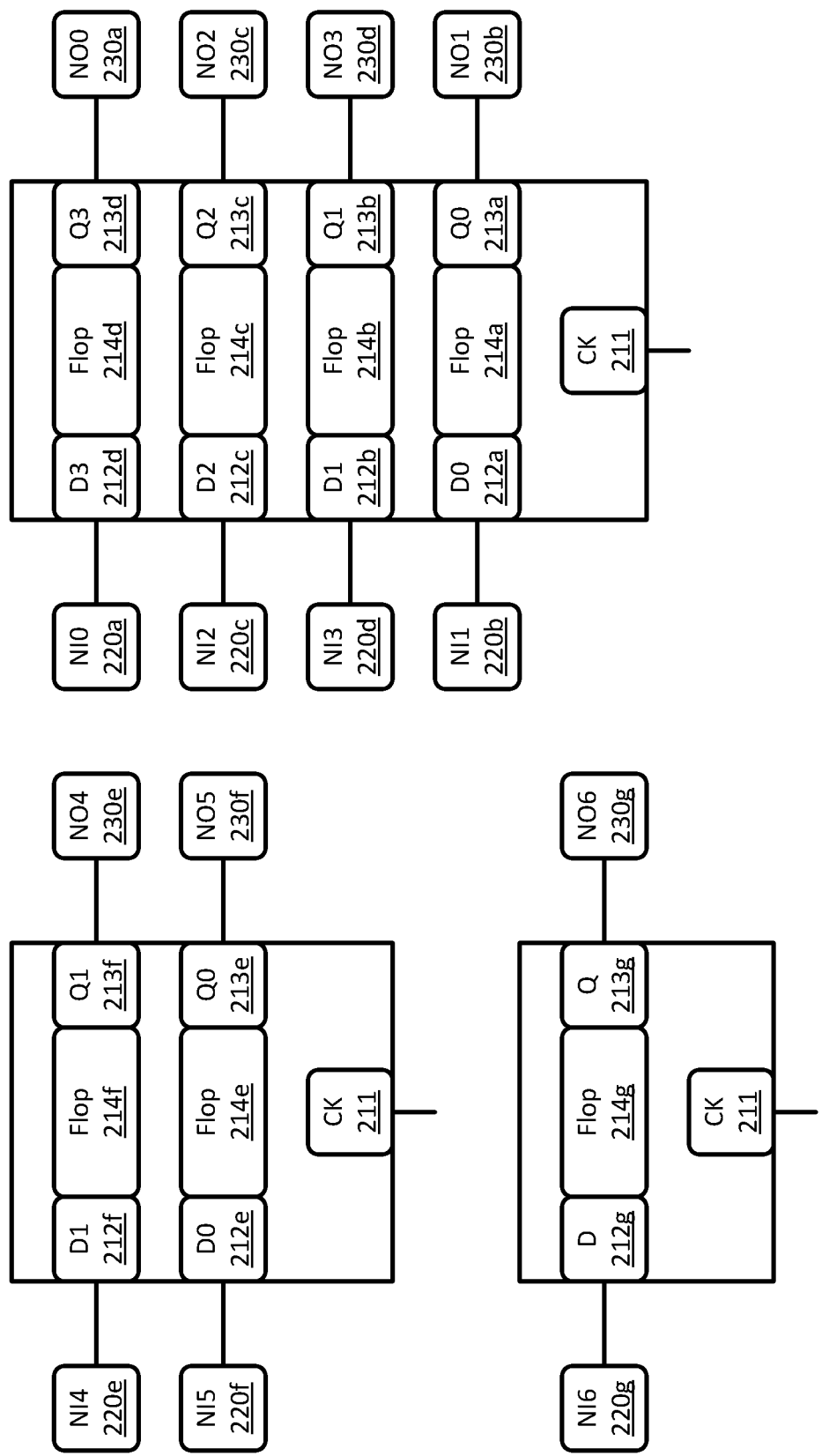
Figure 2C:
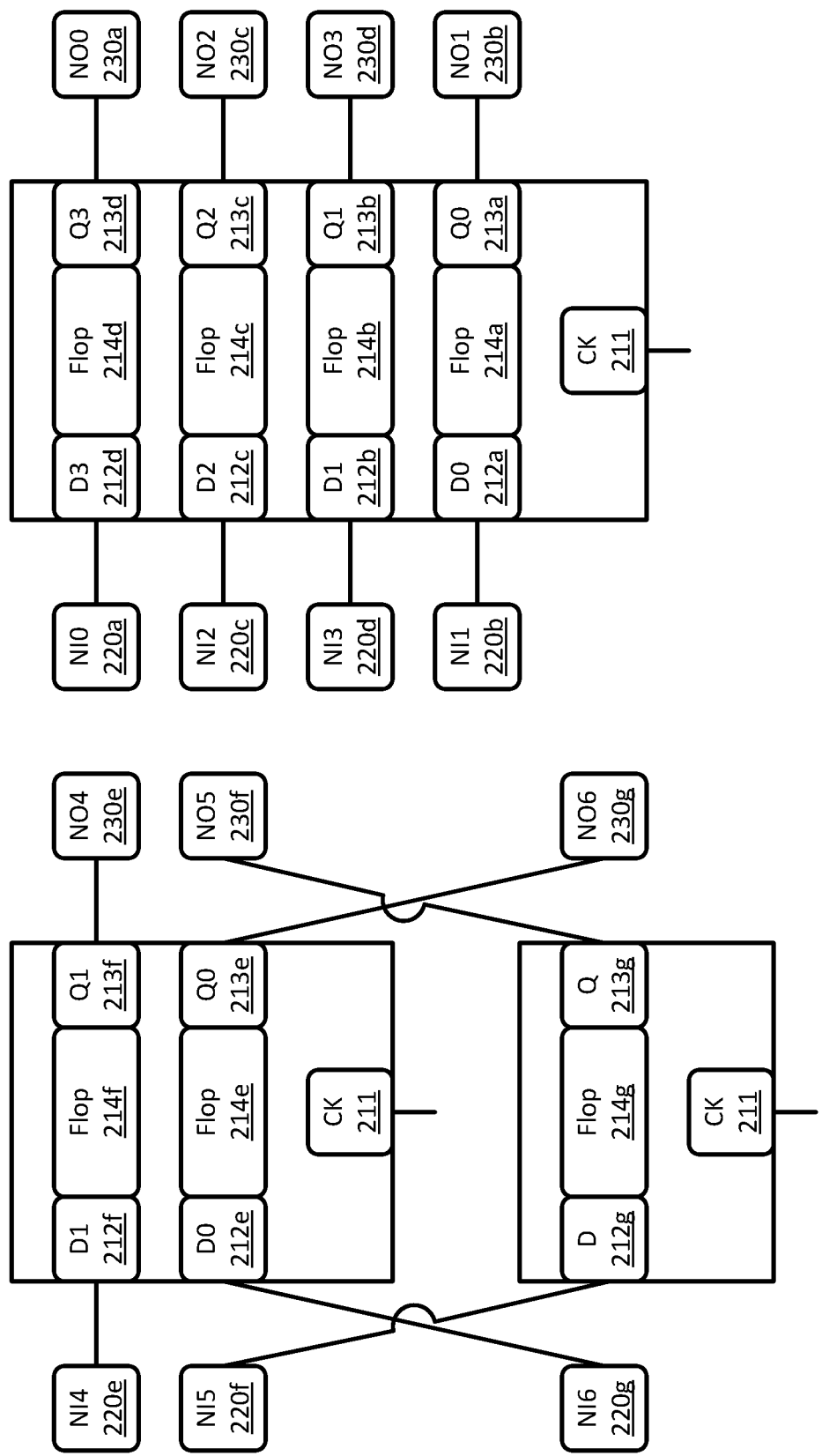

FIGS. 2A-2C illustrate a remapping involving a first MBFF 210a, a second MBFF 210b, and a single-bit FF 210c, according to embodiments of the present disclosure. Accordingly, the benefits of remapping are not limited to remapping the flops within one MBFF, but can be provided across sets of equivalent flops 214a-g that are included in one or more single-bit FFs and one or more MBFFs. In FIGS. 2A-2C, the first MBFF 210a, second MBFF 210b, and single-bit FF 210c each include a shared clock input 211 from a shared clock source.

In FIGS. 2A-2C, the first MBFF 210a is a 4-bit MBFF that includes a first flop 214a with a first physical input 212a and a first physical output 213a (D$_0$ and Q$_0$, respectively), a second flop 214b with a second physical input 212b and a second physical output 213b (D$_1$ and Q$_1$, respectively), a third flop 214c with a third physical input 212c and a third physical output 113c (D$_2$ and Q$_2$, respectively), and a fourth flop 214d with a fourth physical input 112d and a fourth physical output 113d (D$_3$ and Q$_3$, respectively). The second MBFF 210b is a 2-bit MBFF that includes fifth flop 214e with a fifth physical input 212e and a fifth physical output 213e (D$_0$ and Q$_0$, respectively) and a sixth flop 214f with a sixth physical input 212f and a sixth physical output 213f (D$_1$ and Q$_1$, respectively). The single-bit FF 210c includes one flop (i.e., the seventh flop 214g) with a seventh physical input 212g and a seventh physical output (D and Q, respectively). As will be appreciated, remapping can include more or fewer than three flip-flop cells in a layout and with more or fewer than seven flops in different arrangements than is shown in FIGS. 2A and 2B.

In FIG. 2A, in the first MBFF 210a, the first flop 214a receives a second logical input 220b and outputs a second logical output 230b (NI$_1$ and NO$_1$, respectively), the second flop 214b receives a fifth logical input 220e and outputs a fifth logical output 230e (NI$_4$ and NO$_4$, respectively), the third flop 214c receives a third logical input 220c and outputs a third logical output 230c (NI$_2$ and NO$_2$, respectively), and the fourth flop 214d receives a fourth logical input 220d and outputs a fourth logical output 230d (NI$_3$ and NO$_3$, respectively). In the second MBFF 210b of FIG. 2A, the fifth flop 214 receives a seventh logical input 220g and outputs a seventh logical output 230g (NI$_6$ and NO$_6$, respectively), and the sixth flop 214f receives a first logical input 220a and outputs a first logical output 230a (NI$_0$ and NO$_0$, respectively). In the single-bit FF 210c of FIG. 2A, the seventh flop 214g receives a sixth logical input 220f and outputs a sixth logical output 230f (NI$_5$ and NO$_5$, respectively).

FIG. 2B illustrates a first remapped version of the FFs 210a-c shown in FIG. 2A, in which the logical inputs 220 and logical outputs 230 are rewired so as to be remapped to different, but logically equivalent, flops to avoid or mitigate the effects of the indirect paths to from the corresponding physical inputs 212 and physical outputs 213.

In FIG. 2B, in the first MBFF 210a, the first flop 214a receives a second logical input 220b at the first physical input 212a and outputs from the first physical output 213a to the second logical output 230b (NI$_1$ to Do and Q$_0$ to NO$_1$, respectively), the second flop 214b receives a fourth logical input 220d at the second physical input 212b and outputs from the second physical output 213b to the fourth logical output 230d (NI$_3$ to D$_1$ and Q$_1$ to NO$_3$, respectively), the third flop 214c receives a third logical input 220c at the third physical input 212c and outputs from the third physical output 213c to the third logical output 230c (NI$_2$ to D$_2$ and Q$_2$ to NO$_2$, respectively), and the fourth flop 214d receives a first logical input 220a at the fourth physical input 212d and outputs from the fourth physical output 213d to the first logical output 230a (NI$_0$ to D$_3$ and Q$_3$ to NO$_0$, respectively).

In FIG. 2B, in the second MBFF 210b, the fifth flop 214e receives the sixth logical input 220f at the fifth physical input 212e and outputs from the fifth physical output 213e to the sixth logical output 230f (NI$_5$ to Do and Q$_0$ to NO$_5$, respectively), and the sixth flop 214f receives a fifth logical input 220e at the sixth physical input 212f and outputs from the sixth physical output 213f to the fifth logical output 230e (NI$_4$ to D$_1$ and Q$_1$ to NO$_4$, respectively).

In FIG. 2B, in the single-bit FF 210c, the seventh flop 214g receives a seventh logical input 220g at the seventh physical input 212g and outputs from the seventh physical output 213g to the seventh logical output 230g (NI$_6$ to D and Q to NO$_6$, respectively).

FIG. 2C illustrates a second remapped version of the FFs 210a-c shown in FIG. 2A, in which the logical inputs 220 and logical outputs 230 are rewired so as to be remapped to different, but logically equivalent, flops to avoid or mitigate the effects of the indirect paths to from the corresponding physical inputs 212 and physical outputs 213. The first MBFF 210a in FIG. 2C is wired identically to the first MBFF 210a in FIG. 2B, however, in the second MBFF 210b and the single-bit FF 210c are wired differently in FIGS. 2B and 2C.

As shown in FIG. 2C, in the second MBFF 210b, the fifth flop 214e receives the seventh logical input 220g at the fifth physical input 212e and outputs from the fifth physical output 213e to the seventh logical output 230g (NI$_0$ to Do and Q$_0$ to NO$_6$, respectively), and the sixth flop 214f receives a fifth logical input 220e at the sixth physical input 212f and outputs from the sixth physical output 213f to the fifth logical output 230e (NI$_4$ to D$_1$ and Q$_1$ to NO$_4$, respectively). In the single-bit FF 210c, the seventh flop 214g receives a sixth logical input 220f at the seventh physical input 212g and outputs from the seventh physical output 213g to the sixth logical output 230f (NI$_5$ to D and Q to NO$_5$, respectively).

In various embodiments, the individual flops in a set of equivalent flops may be remapped in a variety of different ways. Accordingly, the remappings shown in FIGS. 2B and 2C may be different solutions to one cost function (e.g., finding different local maxima/minima) or may be solutions to different cost functions (e.g., based on power consumption, wire length, wire load, wiring congestion, precision of clock timing, reducing the number of flops remapped, etc.).

Figure 3:
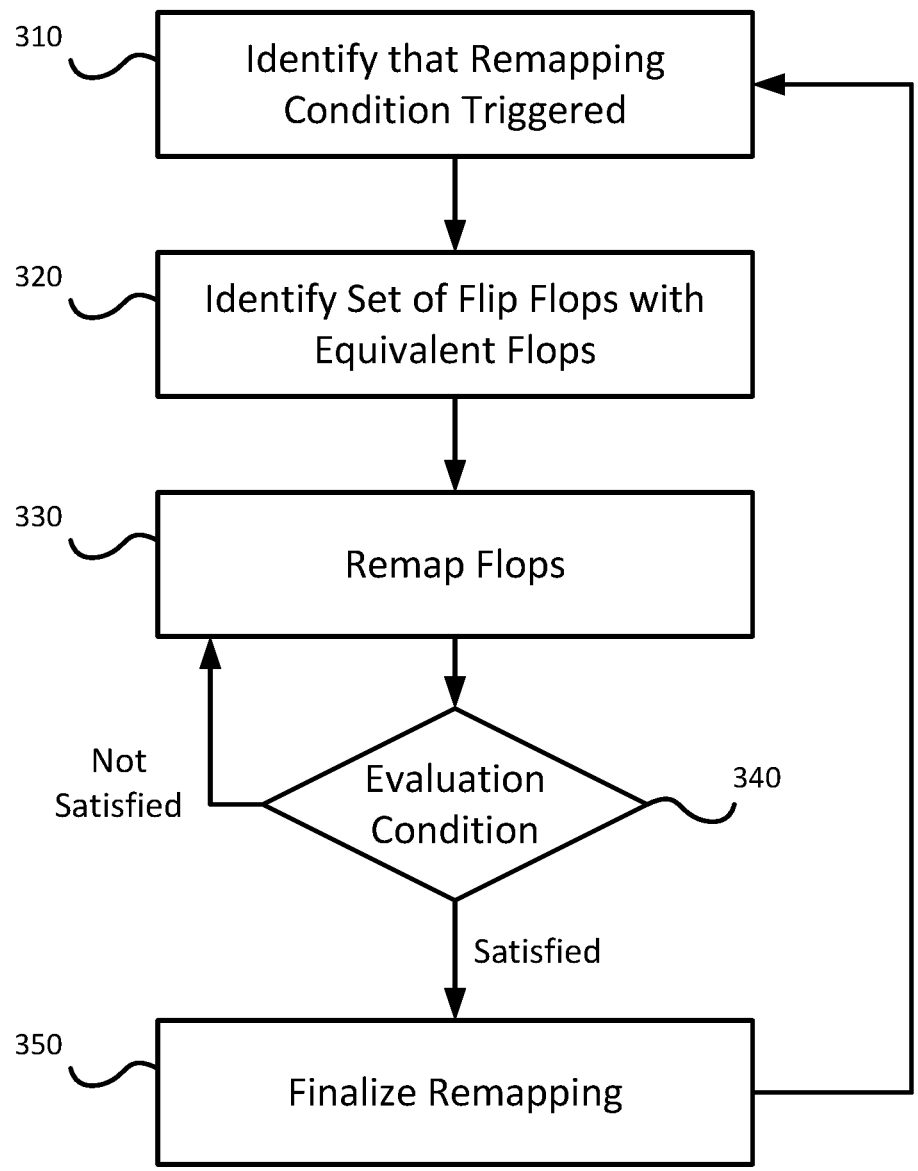
FIG. 3 is a flowchart of a method for remapping flops, according to embodiments of the present disclosure.

FIG. 3 is a flowchart of a method 300 for refining MBFF mapping without explicit de-banking and re-banking operations, according to embodiments of the present disclosure. Method 300 begins at block 310 where a device or tool identifies that a remapping condition has been triggered for some or all of the MBFFs in a layout. In various embodiments, the remapping condition is triggered when a cost function (e.g., based on power consumption, wire length, wire load, wiring congestion, precision of clock timing, etc.) falls below a threshold value, in response to a manual command from a user, in response to a wire layout or routing operation affecting an MBFF, a bit or flop in an MBFF indicating that its timing is outside of an operational range (e.g., due to the addition or removal of another element to the layout), or any other condition that might otherwise result in a de-banking and re-banking of individual bits in an MBFF.

At block 320 the device or tool identifies a set of logically equivalent flops. In some embodiments, the set of logically equivalent flops are selected from a region of the layout or a subset of the FFs in the layout. The logically equivalent flops are those flops with the same set of inputs/outputs (cf., flops with scan versus flops with scan and reset) and receive a clock signal from a shared clock source as one another. In some embodiments, the device or tool, based on user selection or system settings, can identify the set of FFs as those FFs within a selected sub-region of the layout or within a predefined range of one another.

At block 330, the device or tool remaps two or more flops from the set to improve one or more aspects of the layout (e.g., to optimize the layout based on one or more features according to a cost function). The tool or device performs a global remapping within the set of FFs identified (per block 320) in which every logically equivalent flop can potentially have its associated logic rerouted to a different flop.

As will be appreciated, in one embodiment, the physical locations of the flops do not change. The input signals and output signals are instead rerouted to have existing hardware perform different logical tasks. The logic for the flops can be remapped within a single MBFF (e.g., to a different bit in the same MBFF), from a first bit in a first MBFF to a second bit in a second MBFF, from a single-bit FF to an MBFF, or from an MBFF to a single-bit FF.

Accordingly, the device or tool identifies at least a first flop (having a first logic routing and a first physical location) and a second flop (having a second logic routing and a second physical location), and remaps the first logic routing (i.e., the input and output data signals) of the first flop from the first physical location (i.e., where the hardware of the bit is located in the layout) to the second location and the second logic of the second flop from the second location to the first location. Stated differently, for a first flop receiving input from a first input and providing output to a first output and a second flop included in a multi-bit flip-flop (MBFF), and for a second flop receiving input from a second input and providing output to a second output, the device or tool remaps the first flop to receive input from the second input and provide output to the second output and the second flop to receive input from the first input and provide output to the first output. The hardware for neither the first nor second flop is de-banked or re-banked and remains located at the same location in the layout.

Remapping can be performed on several flops in the set in parallel, and need not be a 1:1 swap between two flops. For example, the device or tool can identify three flops (each with a corresponding logic node and physical node (i.e., the hardware of an individual flop) in the layout) and remap the first logic node to the second physical node, the second logic node to the third physical node, and the third logic node to the first physical node (i.e., $logic_1$ to $location_1$, $logic_2$ to $location_3$, $logic_3$ to $location_1$). In another example, the device or tool can identify three flops (each with a corresponding logic node and physical node in the layout) and remap the first logic node to the second physical node and second logic node to the first physical node in a first iteration, and, in a second iteration, remap the third logic node to the first physical node and the second logic node to the third physical node (i.e., $logic_1$ to $location_2$ and $logic_2$ to $location_1$, then $logic_2$ to $location_3$ from $location_1$ and $logic_3$ to $location_1$).

The tool or device may remap the flops in the set over several iterations until an evaluation condition is satisfied per block 340. When the evaluation condition is not satisfied, method 300 performs an additional iteration of block 330. When the evaluation condition is satisfied, method 300 proceeds to block 350. In various embodiments, the evaluation condition is a threshold value or change value between iterations based on the cost function that the device or tool is remapping the flops to improve. For example, when the remapping improves the cost function to a given threshold value, or when the difference in the cost function between iteration N and iteration N+1 is below a change threshold, the evaluation condition is satisfied. In another example, when the remapping operation has been performed for at least t time, a timeout threshold may satisfy the evaluation threshold.

At block 350, the device or tool finalizes the remapping, and routes the wires or traces to the corresponding inputs or outputs of the flops in the set. Method 300 may repeat, returning to block 310, in response to the device or tool identifying that a further remapping condition has been triggered.

Figure 4:
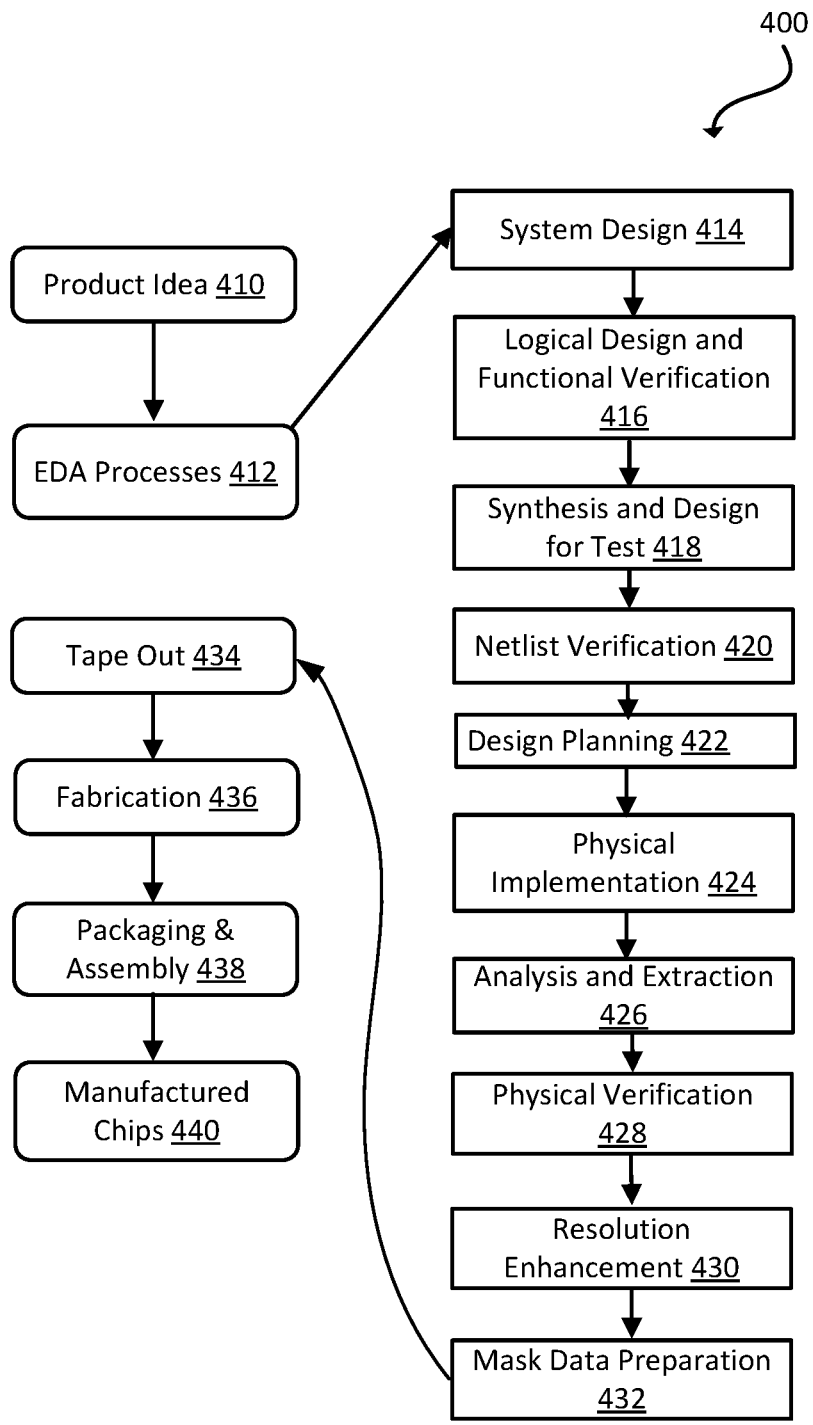
FIG. 4 depicts a flowchart of various processes used during the design and manufacture of an integrated circuit in accordance with some embodiments of the present disclosure.

FIG. 4 illustrates an example set of processes 400 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 410 with information supplied by a designer, information which is transformed to create an article of manufacture that uses a set of EDA processes 412. When the design is finalized, the design is taped-out 434, which is when artwork (e.g., geometric patterns) for the integrated circuit is sent to a fabrication facility to manufacture the mask set, which is then used to manufacture the integrated circuit. After tape-out, a semiconductor die is fabricated 436 and packaging and assembly processes 438 are performed to produce the finished integrated circuit 440.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 4. The processes described by be enabled by EDA products (or tools).

During system design 414, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 416, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 418, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 420, the netlist is checked for compliance with timing constraints and for correspondence with the HDL code. During design planning 422, an overall floor plan for the integrated circuit is constructed and analyzed for timing and top-level routing.

During layout or physical implementation 424, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 426, the circuit function is verified at the layout level, which permits refinement of the layout design. During physical verification 428, the layout design is checked to ensure that manufacturing constraints are correct, such as DRC constraints, electrical constraints, lithographic constraints, and that circuitry function matches the HDL design specification. During resolution enhancement 430, the geometry of the layout is transformed to improve how the circuit design is manufactured.

During tape-out, data is created to be used (after lithographic enhancements are applied if appropriate) for production of lithography masks. During mask data preparation 432, the 'tape-out' data is used to produce lithography masks that are used to produce finished integrated circuits.

A storage subsystem of a computer system (such as computer system 500 of FIG. 5) may be used to store the programs and data structures that are used by some or all of the EDA products described herein, and products used for development of cells for the library and for physical and logical design that use the library.

Figure 5:
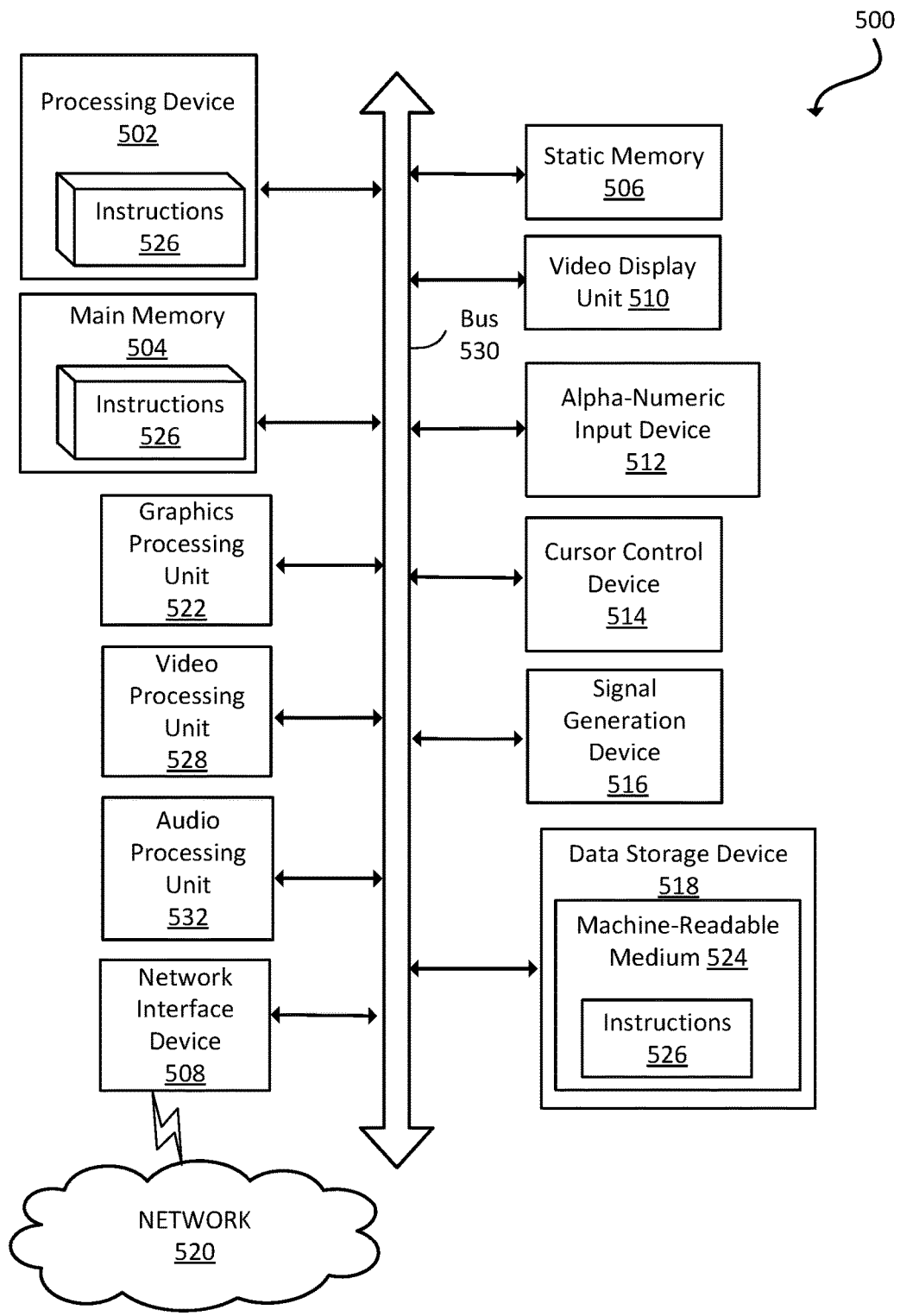
FIG. 5 depicts an abstract diagram of an example computer system in which embodiments of the present disclosure may operate.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 may be configured to execute instructions 526 for performing the operations and steps described herein.

The computer system 500 may further include a network interface device 508 to communicate over the network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a graphics processing unit 522, a signal generation device 516 (e.g., a speaker), graphics processing unit 522, video processing unit 528, and audio processing unit 532.

The data storage device 518 may include a machine-readable storage medium 524 (also known as a non-transitory computer-readable medium) on which is stored one or more sets of instructions 526 or software embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media.

In some implementations, the instructions 526 include instructions to implement functionality corresponding to the present disclosure. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 502 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
    identifying a set of equivalent flops in a layout including:
        a first flop having a first logic routing and a first location in the layout;
        a second flop having a second logic routing and a second location in the layout; and
        a third flop having a third logic routing and a third location in the layout; and
    in response to determining that a first output of a cost function for a first remapping of the first flop and the second flop exceeds a second output of the cost function for a second mapping of the first flop and the third flop, wherein the cost function is based on wiring considerations in a layout, remapping the first logic of the first flop from the first location to the second location and the second logic of the second flop from the second location to the first location.

2. The method of claim 1, wherein remapping the first logic routing to the second location and the second logic routing to the first location is performed in parallel with one or more additional remapping operations of additional equivalent flops in the set of equivalent flops.

3. The method of claim 1, further comprising:
    identifying the set of equivalent flops in response to triggering a remapping condition in a layout that includes the set of equivalent flops based on the cost function, wherein the wiring considerations include at least one of:
wiring congestion in a layout;
wire load in the layout;
wire length in the layout;
clock timing for two flops to be remapped; and
power consumption in the layout.

4. The method of claim 1, wherein the first location and the second location are included in a shared Multibit Flip-Flop (MBFF).

5. The method of claim 1, wherein the first location is included in a first MBFF and the second location is included in a second MBFF.

6. The method of claim 1, wherein the first location is included in a first MBFF and the second flop is included in a single-bit flip-flop.

7. A method, comprising:
identifying a first multibit flip-flop (MBFF) having a first flop satisfying a remapping condition;
identifying a second flop that is a single-bit flip-flop that is logically equivalent to the first flop;
identifying a third flop that is logically equivalent to the first flop and the second flop;
remapping a first data signal of the first flop to the second flop and a second data signal of the second flop to the first flop; and
after remapping the first data signal of the first flop to the second flop and the second data signal of the second flop to the first flop, remapping the first data signal of the second flop to the third flop and a third data signal of the third flop to the second flop.

8. The method of claim 7, wherein the second flop is identified from a set of flops that share a clock input with the first flop.

9. The method of claim 7, wherein the first flop satisfies the remapping condition for a cost function based on at least one of:
wiring congestion in a layout;
wire load in the layout;
wire length in the layout;
clock timing for the first flop and the second flop; and
power consumption in the layout.

10. The method of claim 9, wherein remapping the first data signal of the first flop to the second flop and the second data signal of the second flop to the first flop is performed in response to determining that a first remapping of the first flop and the second flop exceeds a second mapping of the first flop and the third flop according to the cost function.

11. The method of claim 7, wherein remapping the first data signal and the second data signal does not affect a first location of the first flop in a layout and does not affect a second location of the second flop in the layout.

12. A system, comprising:
a processor; and
a memory device including instructions that when executed by the processor perform an operation comprising:
identifying a set of equivalent flops in a layout that include:
a first flop receiving input from a first input and providing output to a first output;
a second flop included receiving input from a second input and providing output to a second output; and
a third flop receiving input from a third input and providing output to a third output;
in response to determining that a first output of a cost function for a first remapping of the first flop and the second flop exceeds a second output of the cost function for a second mapping of the first flop and the third flop, wherein the cost function is based on wiring considerations in a layout:
remapping the first flop to receive input from the second input and provide output to the second output; and
remapping the second flop to receive input from the first input and provide output to the first output; and
after remapping the first flop and the second flop:
remapping the second flop to receive input from the third input and provide output to the third output; and
remapping the third flop to receive input from the first input and provide output to the first output.

13. The system of claim 12, wherein the second flop is included in a first multi-bit flip-flop (MBFF) and the first flop is included in one of:
the first MBFF with the second flop; or
a different MBFF than the first MBFF including the second flop.

14. The system of claim 12, wherein the third flop, the second flop and the first flop remain in fixed locations during respective remappings.

15. The system of claim 12, wherein the wiring considerations include at least one of:
wiring congestion in a layout including the first flop and the second flop;
wire load in the layout;
wire length in the layout;
clock timing for two flops analyzed according to the cost function; and
power consumption in the layout.

16. The system of claim 12, the first flop and the second flop are remapped in parallel.

17. The system of claim 12, wherein the first flop and the second flop are logically equivalent and operate based on a shared clock signal.

18. The system of claim 12, wherein the second flop is included in a first multi-bit flip-flop (MBFF) and the first flop is included in a single-bit flip-flop.

* * * * *

UNITED STATES PATENT AND TRADEMARK OFFICE
CERTIFICATE OF CORRECTION

| | |
|---|---|
| PATENT NO. | : 11,328,109 B2 |
| APPLICATION NO. | : 16/942861 |
| DATED | : May 10, 2022 |
| INVENTOR(S) | : Deepak Dattatraya Sherlekar et al. |

It is certified that error appears in the above-identified patent and that said Letters Patent is hereby corrected as shown below:

In the Specification

Column 6, Line 54, Delete "($NI_0$ to Do" and insert -- ($NI_6$ to $D_0$ --, therefor.

Column 8, Line 8, Delete "$location_1$," and insert -- $location_2$, --, therefor.

Signed and Sealed this
Fifth Day of July, 2022

*Katherine Kelly Vidal*

Katherine Kelly Vidal
*Director of the United States Patent and Trademark Office*